(12) United States Patent
Gilliland

(10) Patent No.: US 7,496,166 B1
(45) Date of Patent: Feb. 24, 2009

(54) DUAL CLOCK SPREAD FOR LOW CLOCK EMISSIONS WITH RECOVERY

(75) Inventor: Don A. Gilliland, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/111,572

(22) Filed: Apr. 29, 2008

(51) Int. Cl.
*H04L 7/00* (2006.01)
(52) U.S. Cl. .................. 375/354; 375/329; 327/291
(58) Field of Classification Search ................ 375/139, 375/329, 354; 327/108, 119, 122, 291, 296
See application file for complete search history.

(56) References Cited

U.S. PATENT DOCUMENTS

| | | | | |
|---|---|---|---|---|
| 5,136,649 A | * | 8/1992 | Ishikawa | 381/22 |
| 5,329,546 A | | 7/1994 | Lee | |
| 5,673,133 A | * | 9/1997 | Imaoka et al. | 398/202 |
| 5,751,703 A | * | 5/1998 | Kobayashi et al. | 370/321 |
| 6,141,132 A | * | 10/2000 | Palmer et al. | 398/183 |
| 6,154,508 A | | 11/2000 | Ott | |
| 7,057,437 B2 | * | 6/2006 | Yang | 327/291 |
| 7,295,048 B2 | | 11/2007 | Gilliland | |

* cited by examiner

*Primary Examiner*—Chieh M. Fan
*Assistant Examiner*—Freshteh N Aghdam
(74) *Attorney, Agent, or Firm*—Leveque IP Law, P.C.

(57) ABSTRACT

A method and apparatus provides for the generation and recovery of a stable clock signal having harmonic emission suppressions using dual spread spectrum clock signals. The transmission frequencies of non-mixed, spread spectrum lower frequency clock signals may be varied and, upon receipt of these non-mixed signals, they are mixed into sum and difference signals. The sum signal thus generated is representative of the desired clock signal to be recovered. Such conditioning of the non-mixed signals need only occur within the receiver, thereby allow the channel that transmits the non-mixed lower frequency clock signals to the receiver to be lower bandwidth than would be required to carry the final, recovered, and higher frequency clock signal produced by the receiver.

1 Claim, 3 Drawing Sheets

100

DUAL CLOCK SPREAD FOR LOW CLOCK EMISSIONS WITH RECOVERY

BACKGROUND

The present invention relates to clock generation in general, and, in particular, to a method and apparatus for generating recovered clock signals with harmonic emission suppression.

Many electronic devices employ processors and/or other digital circuits that require clock signals for synchronization. Clock signals may be generated by a free-running oscillator driven by a crystal, an LC-tuned circuit, or an external clock source. Parameters of such clock signals may include maximum and minimum allowable clock frequencies, tolerances at high and low voltage levels, maximum rise and fall times on waveform edges, pulse-width tolerance for a non-square wave, and the timing relationship between clock phases if two-clock phase signals are needed.

High-speed electronic circuits are particularly susceptible to generating and radiating electromagnetic interference (EMI). Accordingly, many regulatory agencies, such as the Federal Communication Commission (FCC) and the Comite International Special Des Perturbations Radioelectriques (CISPR), have established maximum allowable EMI emission standards for electronic equipments, and promulgate guidelines concerning measurement equipment and techniques for determining EMI compliance.

The spectral components of the EMI emissions typically have peak amplitudes at harmonics of the fundamental frequency of a clock circuit. In order to comply with the above-mentioned governmental limits on EMI emissions, costly suppression measures or extensive shielding may need to be utilized. Other approaches for reducing EMI emissions include careful routing of signal traces on printed circuit boards to minimize loops and other potentially radiating structures. However, EMI emissions are made worse at higher clock speeds. Consequently, it would be desirable to provide an improved method and apparatus for generating high-speed clock signals having relatively low EMI emissions.

BRIEF SUMMARY

In accordance with embodiments consistent with the present invention, a method and apparatus provides for the generation and recovery of a stable clock signal having harmonic emission suppressions using a dual spread spectrum clock signals. The method comprises: generating first and second lower frequency dual clock signals from a high frequency clock signal, wherein said first and second lower frequency dual clock signals have respective frequencies that are less than a frequency of the high frequency clock signal; frequency modulating said first and second lower frequency dual clock signals to generate first and second modulated clock signals that sweep in opposing directions with respect to one another in a spectrum of operation; a receiver receiving said first and second modulated clock signals; the receiver generating a sum signal and a difference signal from said first and second modulated clock signals; the receiver filtering out the difference signal; and outputting the sum signal as a stable recovered clock signal of the receiver, said stable recovered clock signal having the frequency of the high frequency clock signal.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

In accordance with embodiments consistent with the present invention, a method and apparatus provides for the generation and recovery of a stable clock signal having harmonic emission suppressions using dual spread spectrum clock signals. The transmission frequencies of non-mixed, spread spectrum lower frequency clock signals may be varied and, upon receipt of these non-mixed signals, they are mixed into sum and difference signals. The sum signal thus generated is representative of the desired clock signal to be recovered. Such conditioning of the non-mixed signals need only occur within the receiver, thereby allow the channel that transmits the non-mixed lower frequency clock signals to the receiver to be lower bandwidth than would be required to carry the final, recovered, and higher frequency clock signal produced by the receiver.

Figure 1:
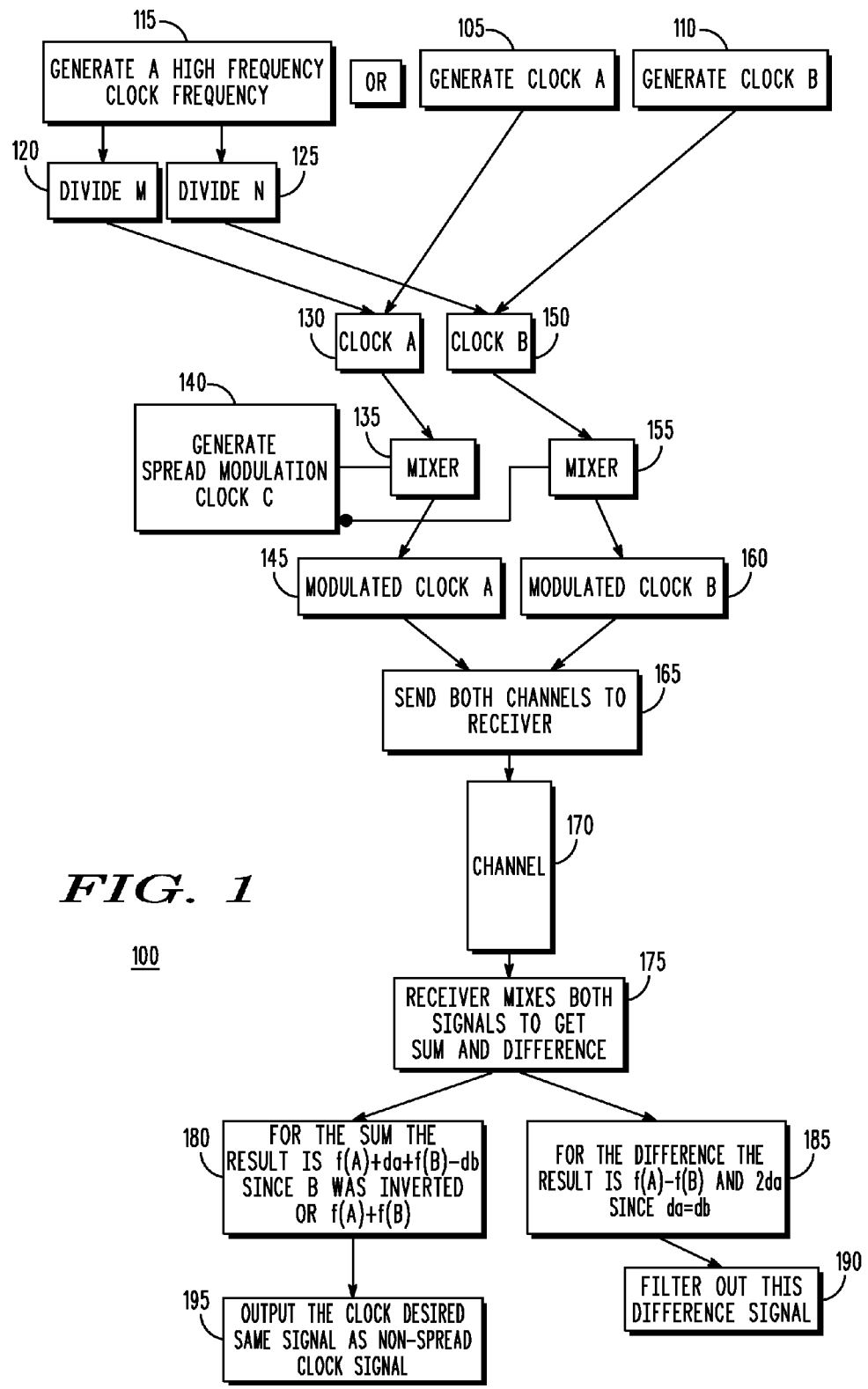
FIG. 1 is a flowchart that illustrates an exemplary flow for recovery of a stable clock signal using dual clock spread spectrum signals, in accordance with various embodiments disclosed herein.

Referring now to the drawings, in FIG. 1, a flowchart 100 illustrates a method for generation and recovery of a stable clock signal using dual spread spectrum clock signals. First, first and second lower frequency dual clock signals, named Clock A and Clock B, are provided at Blocks 130, 150, which will be modulated as will be discussed; these first and second lower frequency dual clock signals at Blocks 130, 150 have respective frequencies that are less than a frequency of the high frequency clock signal at Block 115 to be recovered by a receiver (shown in FIG. 2). As shown in the figure, the lower frequency clock signals at Blocks 130, 150 can be simply supplied, as indicated by the flow from Block 105 to Block 130 and from Block 110 to Block 150, or, optionally, they may be generated from a high frequency clock signal at Block 115. In the later case, the high frequency clock signal 115 is divided by two divisors, such as by M in Block 120 and by N in Block 125, to generate the first and second lower frequency dual clock signals at Blocks 130, 150, that are coherent with respect to one another, thereby making them easier to recover later by the receiver. These lower frequency clock signals, are presented to respective mixers at Blocks 135, 155, to generate modulated clock signals, named Modulated Clock A and Modulated Block B, respectively, at Blocks 145, 160 as shown. Mixers at Blocks 135, 155 frequency modulate (FM) Clock A and Clock B to cause them to sweep in the frequency spectrum of operation in opposite directions with respect to one another; i.e. while one signal is sweeping in an upward frequency direction, the other signal is sweeping in a downward frequency direction. The modulated clock signals Modulated Clock A, Modulated Clock B generated at Blocks 145, 160 do not, therefore, combine since they are linear coherent signals.

Moreover, a spread modulation Clock C may be generated at Block 140. The spread modulation Clock C may be a simple sinusoidal signal or a triangle wave that may be optimized depending on the portion of the spectrum to be addressed; for instance, it may be optimized at approximately 120 kHz or 1 MHz. Or, the signal can be optimized by the "Hershey Kiss" pattern known in the industry to have a benefit to reducing the rise in spectral amplitude near the edges of the spread signal. The modulation clock signal 255 may be as law as 20 kHz but often does not go lower due to the risk of producing audible effects in some circumstances.

Figure 3:
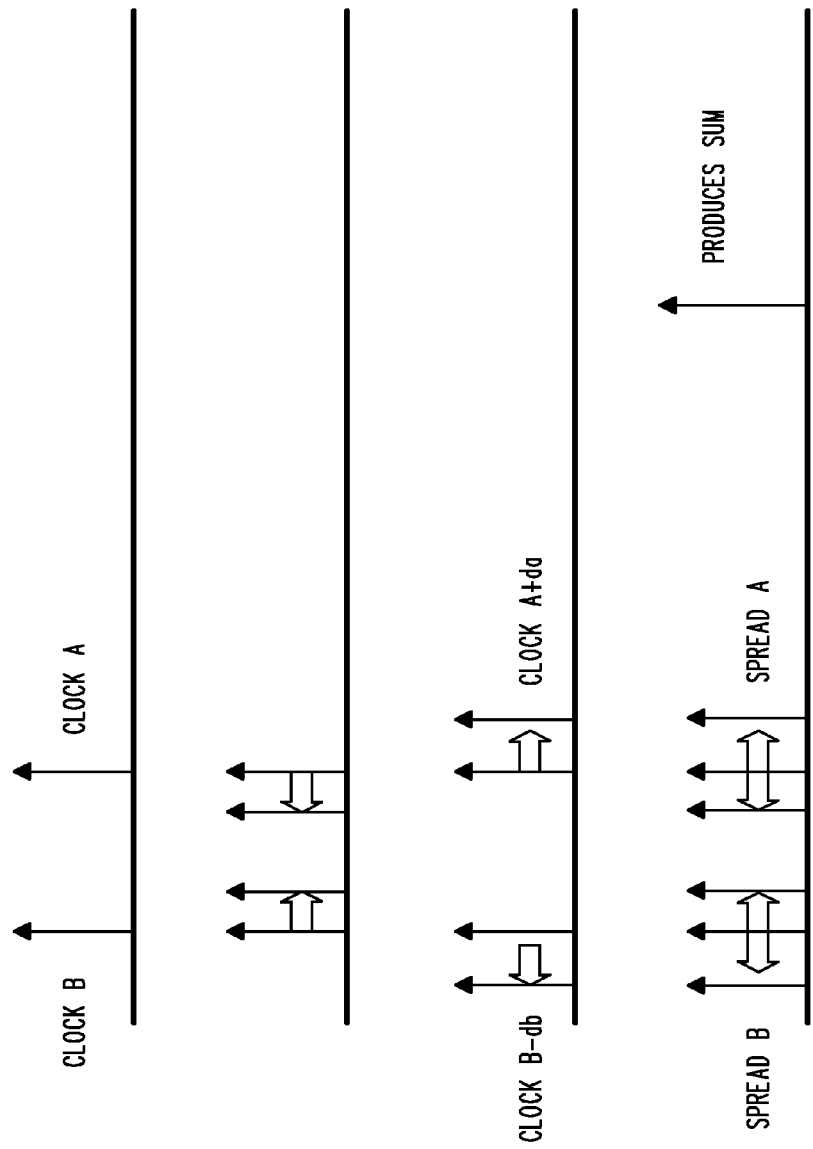
FIG. 3 is a frequency or spectral diagram that illustrates the relationships between the clock, sum and difference signals, in accordance with various embodiments disclosed herein.

Both the first and second modulated clock signals at Blocks 145, 160 are sent to a receiver via a channel, as illustrated at Blocks 165 and 170. AT Block 175, the receiver mixes both first and second modulated clock signals to obtain a sum signal and a difference signal. AT Block 180, the sum signal is given by f(A)+da+f(B)−db, since Clock B is inverted with respect to Clock A in this particular example. Or, in the event that Clock A and Clock B are not inverted, the sum may be given simply as f(A)+da+f(B). This sum signal generated at Block 180 is the stable recovered clock signal output by the receiver at Block 195 and has a frequency that matches that of the original high frequency clock signal at Block 115. At Block 185, the difference signal is given by f(A)−f(B) and 3da, since da=db. This difference signal may be filtered out by the receiver at Block 190 as shown. FIG. 3 is a frequency/spectral diagram that illustrates the relationships between the clock, sum and difference signals.

Figure 2:
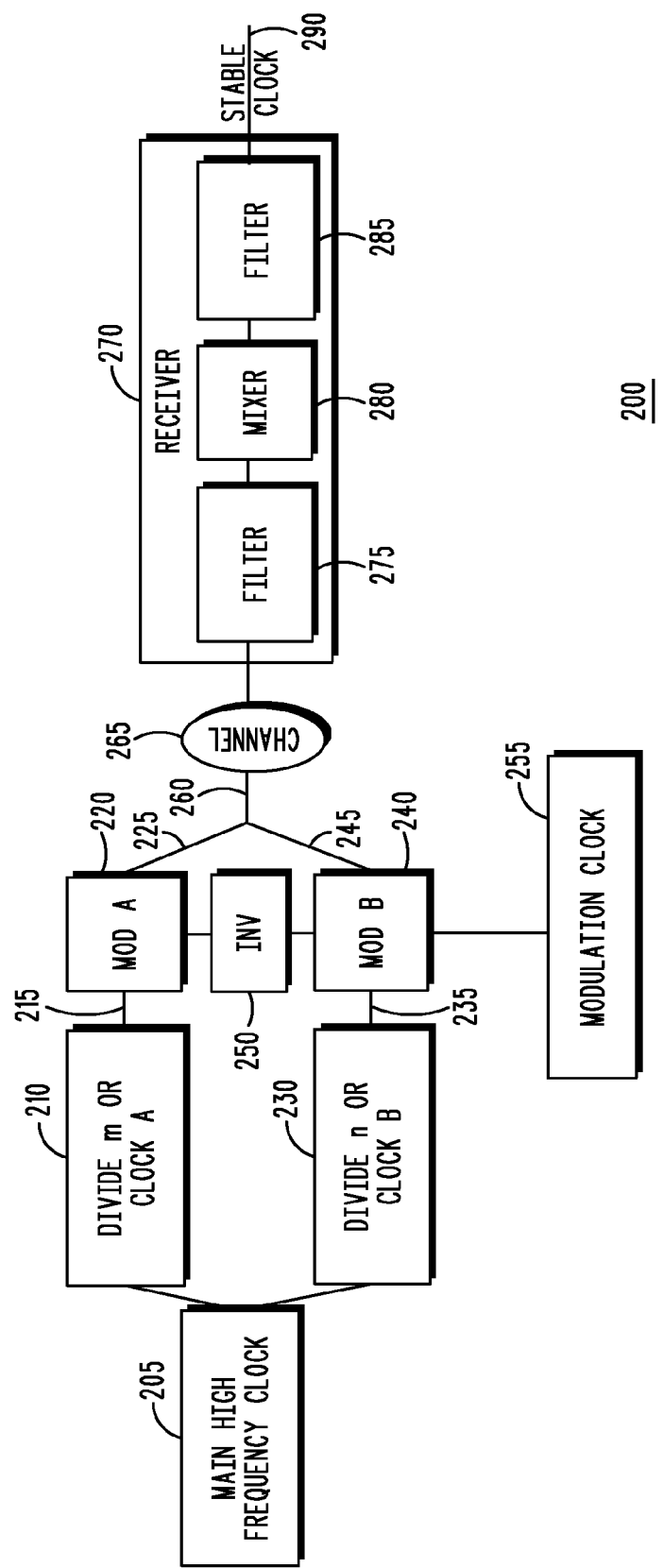
FIG. 2 is a block diagram that illustrates an apparatus that supports recovery of a stable clock signal using dual clock spread spectrum signals, in accordance with various embodiments disclosed herein.

Referring now to FIG. 2, Block diagram 200 illustrates an apparatus that provides for generation and recovery of a stable clock signal having harmonic emission suppressions using dual spread spectrum clock signals. High frequency clock 205 (it may also be referred to as a main clock) is provided to Blocks 210 and 230. As previously discussed, the first and second lower frequency dual clock signals may be derived from the main high frequency clock 205, such as by dividers, or indirectly; this is reflected in the functionality associated with Blocks 210, 230. These first and second lower frequency dual clock signals 215, 235 have respective frequencies that are less than a frequency of the high frequency clock signal 205.

At any rate, first and second lower frequency dual clock signals 215 and 235 are presented to modulators 220 and 240, respectively, to generate first and second modulated clock signals 225, 245, respectively. Modulators 220, 240 may be mixers that frequency modulate (FM) the signals in order to cause them to sweep the frequency spectrum of operation in opposing directions with respect to one another. First and second modulated clock signals 225, 245 will not combine since they are linear, coherent signals derived from main frequency clock 205 in this manner. These signals 225, 245, may further be inverse with respect to each other, in indicated by inverter 250. Also, modulators 220 and 240 work together to generate a spread modulation Clock C, shown as signal 255. As previously mentioned, the spread modulation Clock C may be a simple sinusoidal signal or a triangle wave that may be optimized depending on the portion of the spectrum to be addressed; for instance, it may be optimized at approximately 120 kHz or 1 MHz. Or, the signal can be optimized by the "Hershey Kiss" pattern known in the industry to have a benefit to reducing the rise in spectral amplitude near the edges of the spread signal. The modulation clock signal 255 may be as law as 20 kHz but often does not go lower due to the risk of producing audible effects in some circumstances.

The first and second modulated clock signals 225, 245 may be combined 260 into a single net or channel 265 for communication to the receiver 270. Upon the combined signal 260 representative of the first and second modulated clock signals being received by the receiver 270, the signal may be filtered to keep the mixed output 290 from coupling back onto the channel 265; the filter 275 may be a low pass filter. The filtered first and second modulated signals are then mixed by mixer 280 to generate a sum signal and a difference signal from the first and second modulated clock signals. Mixer 280 need only be a simple non-linear device, such as a diode, to produce the sum and difference signals. The difference signal is then filtered out by filter 285, which may be a bandpass or high-pass filter, leaving the recovered clock signal 290 that is output from the receiver.

It is noted that channel 265 need only have the bandwidth necessary to accommodate the two modulated clock signals 225, 245 that are spread spectrum, i.e. separated in frequency. Channel 265 does not need to have the bandwidth that would be necessary to accommodate the final derived, recovered and stable clock 290.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for generation and recovery of a stable clock signal having harmonic emission suppressions using dual spread spectrum clock signals, comprising:

generating first and second lower frequency dual clock signals from a high frequency clock signal, wherein said first and second lower frequency dual clock signals have respective frequencies that are less than a frequency of the high frequency clock signal;

frequency modulating said first and second lower frequency dual clock signals to generate first and second modulated clock signals that sweep in opposing directions with respect to one another in a spectrum of operation;

receiving said first and second modulated clock signals in a receiver;

generating a sum signal and a difference signal from said first and second modulated clock signals in the receiver;

the receiver filtering out the difference signal;

outputting the sum signal as a stable recovered clock signal of the receiver, said stable recovered clock signal having the frequency of the high frequency clock signal.

* * * * *